Aug. 29, 1967  A. MARTINET  3,338,510
PARKING METERS FOR VEHICLES
Filed Nov. 30, 1965  2 Sheets-Sheet 1

Inventor
André Martinet
by Michael S. Striker
Attorney

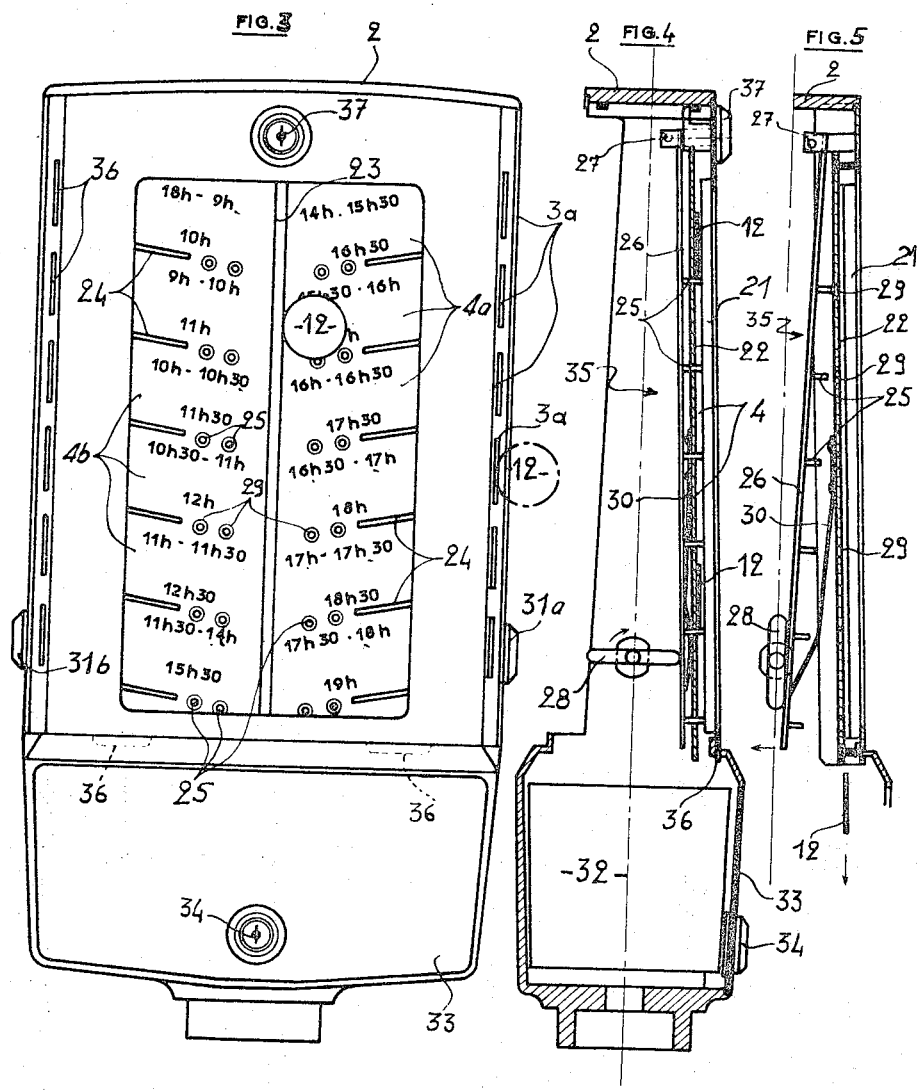

United States Patent Office 3,338,510
Patented Aug. 29, 1967

3,338,510
PARKING METERS FOR VEHICLES
André Martinet, Paris, France, assignor to Societe Anonyme Francaise des Appareils Automatiques Taximetres-Taxiphones-S.A.F.A.A., Paris, France, a French company
Filed Nov. 30, 1965, Ser. No. 510,642
Claims priority, application France, Dec. 4, 1964, 997,457
4 Claims. (Cl. 232—1)

The present invention relates to a parking meter for vehicles.

There are already in existence different types of parking meters. In the known parking meters the user inserts the amount, generally in the form of coins, which corresponds to the required parking time, and the receipt for its payment must appear on the meter in a clear manner which precludes argument, and this indication must remain until the time for which the parking fee has been paid has expired.

In particular, there are known vending machines, including clockwork mechanisms. These machines are generally complicated, relatively sensitive, require periodic overhaul, and are costly.

The parking meter for vehicles according to the present invention comprises a box-shaped casing having horizontal or vertical slots for the insertion therein of coins, each slot corresponding to a predetermined period which is indicated on the casing and being in communication with a visible pocket in which the coins are retained to permit a check on the payment of the fee, means being further provided, operable by an authorised person, for allowing the pocket to be emptied into a removable receptacle.

The parking meter according to the invention may also comprise a mechanism for counting the number of coins inserted, the mechanism receiving an impulse from each coin inserted into the parking meter, an impulse being obtained, for instance, by displacement of a small bar arranged behind the slots. A single pocket may retain in a visible manner one or more coins of the same value or of different values, which makes it possible to employ different tariffs in accordance with the parking times.

Moreover, in the case of the tariffs being changed, the parking meter according to the invention does not have to undergo any change or adjustment; simple indication of the new tariffs will be sufficient.

The removable receptacle arranged in the lower part of the casing is advantageously an automatically-locking till which opens when it is placed in position in the casing and closes when it is removed, so that only someone with a key can open the till and remove the coins.

In the case of a parking meter with horizontal slots, the means which permit the coin to drop into the till are preferably sets of articulated levers actuated by the rotation of a disc which in turn can only be actuated by a key; in a first embodiment of the invention, the aforementioned levers withdraw a bar which is normally positioned below the pockets by causing the bar, for instance, to pivot, while in a second embodiment the levers tilt the rear wall of the pockets, said wall in this case being pivotably mounted.

In the case of a parking meter with vertical slots, the latter are preferably arranged, together with their corresponding pockets, one above the other, the pockets consisting then of slightly inclined chutes enclosed mainly by a transparent wall and a plate which are both flat, parallel to each other and substantially vertical, and by an inclined sliding surface for the coins which surface is, at least in the lowermost part of the chute, replaced by pins which can be withdrawn so as to allow the coins to drop into the removable till.

As the parking meter according to the invention is relatively narrow, two parking meters can be arranged inside the same casing so as to control two parking bays.

Two embodiments of the invention will now be described by way of example with reference to the accompanying drawings, in which:

FIG. 3 is a front view of a parking meter according to the invention with vertical slots.

FIGS. 4 and 5 are two transverse part-sections showing the parking meter of FIG. 3 in two different positions.

Corresponding parts in both embodiments are indicated in the drawings by the same reference numbers.

Figure 1:
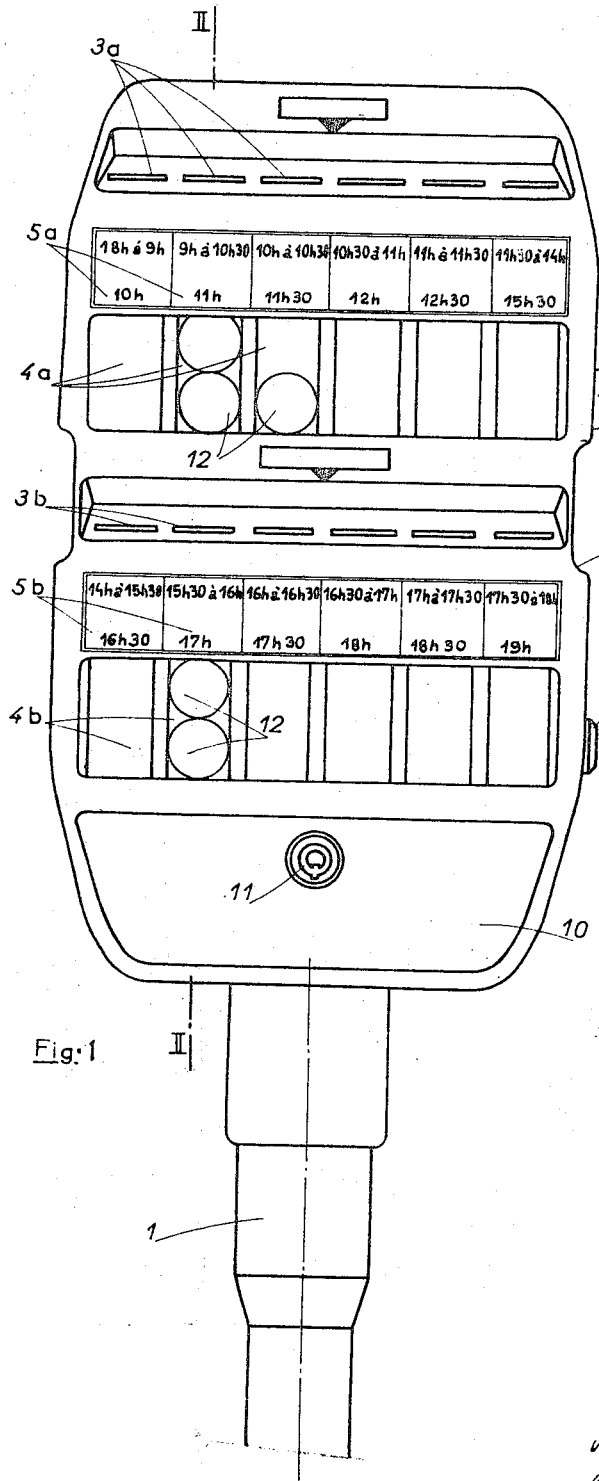
FIG. 1 is a front elevation of a parking meter according to the invention with horizontal slots.
Figure 2:
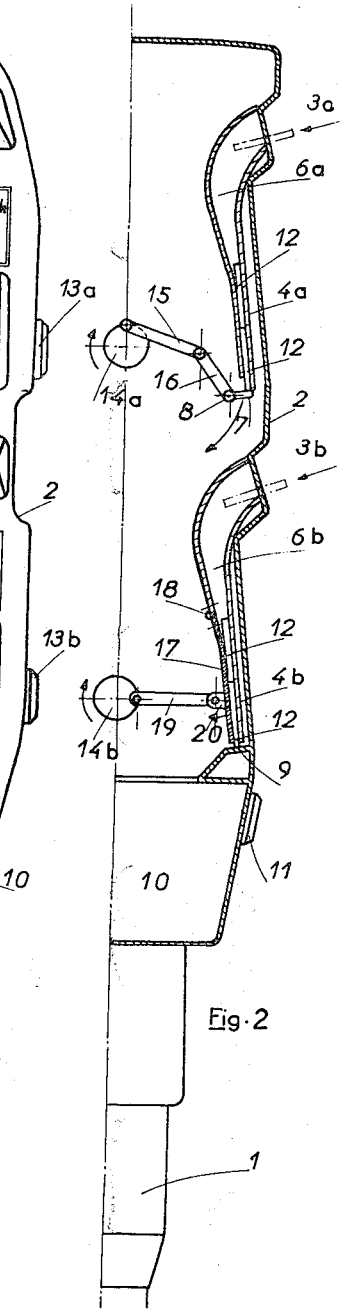
FIG. 2 is a partial section along line II—II of FIG. 1.

The parking meters shown in FIGS. 1 to 5 may be mounted on pillars, such as indicated in FIGS. 1 and 2, set into the ground. The meters comprise a box-shaped casing 2 in whose walls there are formed two rows of slots 3a and 3b which in FIGS. 1 and 2 are arranged along two horizontal lines, and in FIGS. 3 to 5 in two vertical rows, each line or row representing, for instance, a half-day period.

In the following, the parking meter according to FIGS. 1 and 2 will be described more in detail.

Below each slot 3a or 3b, windows 4a and 4b respectively which are closed by a transparent plate are formed in a wall of the casing 2. Next to each slot 3a or 3b and its window 4a or 4b is arranged a small plaque 5a or 5b on which is printed the period of the day to which a particular slot is allocated and, if so desired, the amount of the fee.

The slots 3a and 3b form the upper end of small chutes 6a and 6b (FIG. 2) which are substantially vertical and which have at the level of the windows 4a and 4b a width corresponding to the thickness of a coin, so that the chutes form pockets for the coins which are visible from outside through the transparent wall; arranged below these pockets are removable or fixed abutments, such as a bar 7 which can be pivoted about an axis 8, or an internal flange 9 of the casing.

A removable receptacle 10 which is preferably an automatically-locking till, is arranged in the lower part of the casing and serves to collect the coins after they have been released from their pockets by a suitable action. Only someone with a key fitting the lock 11 of the receptacle 10 can remove the receptacle from the casing.

FIG. 2 shows two different systems for releasing the coins 12 from their pockets, of which one system has a movable abutment formed by the bar 7, and the other a fixed abutment formed by the flange 9. Both systems are actuated by means of keys inserted into locks 13a and 13b which cause discs 14a and 14b to revolve.

A lever 15 is mounted with one end on the disc 14a while at its other end there is pivoted a lever 16 secured to the axis 8 which latter is rotatably supported in the sidewalls of casing 2. Rotation of the disc 14a in the direction of the arrow (FIG. 2) causes the bar 7 to tilt downward, so that the coins 12 can drop into the till 10.

In the case of a fixed abutment 9, the chute 6b can tilt about an axis 18. This tilting movement is obtained through rotation of the disc 14b to which is pivoted one end of a lever 19 whose other end is pivoted to an ear 20 secured to the wall 17 of chute 6b. It will be understood that identical abutments can be used for the closure of the lower ends of the chutes 6a and 6b, which abutments may be either both fixed or both movable. It is also possible to connect to each other the actuating mechanism for both coin-release systems, so that only one key is necessary.

In the following, the embodiment according to FIGS. 3 and 5 will be described more in detail:

The casing 2 has here on two opposite faces an opening closed by a window 21. Behind the window 21 and at a distance slightly greater than the thickness of a coin is a stationary plate 22 parallel to the window 21.

A plurality of pockets 4a and 4b arranged on top of each other in two rows separated by a partition 23 are formed between the plate 22 and the window 21 and by slightly inclined surfaces 24 which extend as far as the two rows of vertical slots 3a and 3b. The time intervals allocated to each pocket are either printed on the plate 22 or on the window 21 or on the casing 2. The surfaces 24 do not extend as far as the partition 23, but are replaced in their lowermost part near that partition by pins 25 which project perpendicularly to the plate 22 into the space between that plate and the window 21. As shown in FIG. 3, the pins 25 constitute a noncontinuous extension of the surfaces 24. The coins 12 therefore roll first over a surface 24 and then over the pins 25 which support them. They abut against the partition 23, as shown in the upper part of FIG. 2.

The pins 25 are fixed on to a flap 26 which can oscillate about a horizontal axis 27. The flap 26, during the periods of normal use of the parking meter is pressed against the plate 22 by means of a cam 28 so that the pins 25 can project through holes 29 in the plate 22 into the space between that plate and the window 21 (FIG. 4). A spring, for instance, a blade 30, urges the flap 26 into a rearward position in which the pins to not project into the space between the plate 22 and the window 21; this position is shown in FIG. 5 where the cam has been turned by 90°.

Preferably, each row of pockets 4a and 4b has its own flap, but is possible to use the same cam 28 for simultaneous action on two flaps 26 which are opposite each other and belong to two similar parking meters respectively mounted behind two opposite walls of the casing 2.

The cams 28 are operated by keys inserted in the locks 31a and 31b. A removable till 32 is arranged in the lower part of the casing and inside a space which can be closed by a door 33 provided with a lock 34. The till 32 is similar to the till 10 or of a type which is absolutely theft-proof.

It will be observed that the entire mechanism of a parking meter forms a removable unit 35 attached to the casing 2 by means of hooks 36 fitting into suitable apertures in the casing and by means of a lock 37 openable by a key.

The operation of the above-described parking meters is very simple. A user inserts into a slot 3 which corresponds to the required parking time one or more identical or different coins which represent the fee indicated on the meter; the coins will then appear behind the transparent wall of the corresponding pocket, either side by side or stacked one above the other, so that payment of the fee can be checked by outside inspection.

At the end of each day or half-day, the coins contained in the pockets are released by someone with the appropriate keys for the locks 13a and 13b, 15a and 15b, and the coins will then drop into the removable till.

Conventional parking meters are not adapted for the payment of different fees corresponding to different times of the day. However, with the parking meter according to the invention it suffices, for instance, to make certain periods shorter than the others, and these periods require a higher fee, or it suffices to indicate higher fees in respect to certain slots.

It will also be observed that in the case of the parking meters shown in FIGS. 3 and 5, the pins 25 are withdrawn successively, with the lower ones first which are the furthest removed from the axis 27. It is therefore possible by turning the cam 28 by a small angle only to release merely those coins which are in the lower pockets. As these pockets correspond preferably to the last periods of the two half-days, only those fees may be collected which might have been paid in advance in contravention of the parking regulations.

It will finally be noted that the parking meters according to the invention make it possible to use tokens instead of coins.

The present invention is not limited to the embodiment described and shown, and other forms and embodiments can be adopted within the framework of the invention.

I claim:

1. A parking meter comprising, in combination, support means; a casing fixed to said support means; partition means in said casing and including a plurality of inclined surfaces forming a plurality of pockets in an upper part of said casing, each corresponding to a certain time of the day marked on said casing and each adapted to receive a plurality of coins of the same or different denominations, and a common substantially vertical discharge passage communicating with the lower end of each pocket, said casing being formed with a plurality of coin inserting slots, one for each pocket, arranged so that coins inserted therein will roll down the respective inclined surface toward said discharge passage; a plurality of abutment means, one for each pocket, in said discharge passage and moveable between a coin retaining position projecting into said discharge passage for retaining coins in the respective pocket, and a coin releasing position withdrawn from said discharge passage; a window in said casing arranged to make coins in said pockets visible; lockable operating means cooperating with said abutment means for moving the latter simultaneously between said positions thereof; and a removable receptacle in said casing arranged at the bottom end of said vertical discharge passage so as to receive coins released from said pockets.

2. A parking meter as defined in claim 1, wherein said casing includes a pair of opposite walls at least one of which is formed with an opening closed by a transparent pane so as to form said window and said partition means including further at least one vertical plate spaced from and substantially parallel to said pane, said inclined surfaces extending between said pane and said plate and the latter being formed in the region of said discharge passage with a plurality of openings therethrough respectively aligned with said inclined surfaces, said abutment means including a plurality of pins respectively projecting through said openings, said lockable operating means including a flap fixedly carrying said pins and being disposed in said casing pivoted about a horizontal axis substantially parallel to said plate, biasing means cooperating with said flap for biasing the same against said plate to a position in which said pins carried thereby are in said coin retaining position, cam means cooperating with said flap for moving the same against the force of said biasing means to another position in which said pins carried thereby are in said coin releasing position, and locking means on said casing for actuating said cam means.

3. A parking meter as defined in claim 2, wherein said removable receptacle is an automatically locking till, opening when placed in position in said casing and closing during removal thereof from said casing.

4. A parking meter as defined in claim 2, wherein said plate and said flap form a removable unit having hooks fitting into suitable apertures in said casing.

References Cited

UNITED STATES PATENTS

| 2,252,253 | 8/1941 | Ferguson. |
| 2,571,082 | 10/1951 | Wilkin et al. |
| 3,173,341 | 3/1965 | Chichester et al. _____ 133—8 X |

ROBERT B. REEVES, *Primary Examiner.*

STANLEY H. TOLLBERG, *Examiner.*